United States Patent [19]
Tabata et al.

[11] Patent Number: 5,244,012
[45] Date of Patent: Sep. 14, 1993

[54] HYDRAULIC PRESSURE CONTROL VALVE

[75] Inventors: Kazumasa Tabata; Manabu Takaoka, both of Nara, Japan

[73] Assignee: Koyo Seiko Co., Ltd., Osaka, Japan

[21] Appl. No.: 920,055

[22] Filed: Jul. 27, 1992

Related U.S. Application Data

[63] Continuation of Ser. No. 739,948, Aug. 2, 1991, Pat. No. 5,133,384.

[30] Foreign Application Priority Data

Aug. 23, 1990 [JP] Japan ............................ 2-88627[U]

[51] Int. Cl.⁵ .................. F15B 13/04; F16K 11/076
[52] U.S. Cl. ........................ 137/625.23; 137/625.24; 91/375 A
[58] Field of Search ............. 137/625.21, 625.22, 137/625.23, 625.24; 91/375 A, 375

[56] References Cited

U.S. PATENT DOCUMENTS

| | | |
|---|---|---|
| 3,591,136 | 7/1971 | Bishop . |
| 4,460,016 | 7/1984 | Haga et al. . |
| 4,624,283 | 11/1986 | Futaba . |
| 4,924,910 | 5/1990 | Tabata et al. . |

FOREIGN PATENT DOCUMENTS 61-94870  5/1986  Japan .

OTHER PUBLICATIONS

SAE Technical Paper Series No. 880706, "Analysis of Stiffness and Feel for a Power-Assisted Rack and Pinion Steering Gear," John Baxter, International Congress and Exposition, Detroit, Michigan Feb. 1929--Mar. 4, 1988.

*Primary Examiner*—A. Michael Chambers
*Attorney, Agent, or Firm*—Townsend and Townsend Khourie and Crew

[57] ABSTRACT

A hydraulic pressure control valve, wherein a valve body having six oil grooves on its outer periphery at specified intervals is rotatably disposed in a cylindrical casing having six oil grooves on its inner periphery at specified intervals, and throttles are constructed on both sides of the respective oil grooves, thereby two throttling units each of which consisting of six throttles, are constructed and respective two throttles facing to each other in the radial direction among respective six throttles constructing respective throttling units have regions in which throttle areas do not substantially change until the relative angular displacement between the valve body and the casing reaches a predetermined magnitude.

9 Claims, 7 Drawing Sheets

HYDRAULIC PRESSURE CONTROL VALVE

This is a continuation of application Ser. No. 07/739,948 filed Aug. 2, 1991, now U.S. Pat. No. 5,133,384.

BACKGROUND OF THE INVENTION

1. Field of the Invention

The present invention relates to a hydraulic pressure control valve which controls pressure oil to be given to two different destinations corresponding to a relative angular displacement between the valve and the casing, particularly to a hydraulic pressure control valve which is used in a hydraulic power steering apparatus in order to control pressure oil to be given to two oil chambers of a hydraulic double acting cylinder for steering assisting corresponding to steering operation.

2. Description of Related Art

There is a hydraulic power steering apparatus which generates hydraulic pressure force in a hydraulic double acting cylinder provided in a steering mechanism, corresponding to direction and strength of steering torque applied to a steering wheel and assists force required for steering operation. In such a power steering apparatus, a hydraulic pressure control valve constructed in the middle of a steering shaft is disposed between a hydraulic pump (pressure oil supply source) driven by an engine and an oil tank (discharge port) maintained at a low pressure, and two oil chambers of a hydraulic cylinder (destination). By the operation of hydraulic pressure control valve, pressure oil to the two oil chambers is controlled corresponding to steering operation.

As a hydraulic pressure control valve, whose cross sectional view is shown in FIG. 1, is generally used. In the control valve, there are provided a cylindrical casing 10 having a plurality of oil grooves 11, 11, . . . extending in the axial direction on its inner peripheral surface at specified intervals and a cylindrical valve body 12 axially and rotatably disposed in the casing 10, and having oil the same number of grooves 13, 13 . . . as the oil grooves 11, 11 . . . , extending in the axial direction, on its outer peripheral surface at specified intervals, thereby aforementioned control operation is carried out according to the relative angular displacement around the axis between the both. The casing 10 and the valve body 12 are so arranged that the former oil grooves 11, 11 . . . and the latter oil grooves 13, 13 . . . are stagger-arranged in the peripheral direction. Both of the communicating portions between the oil groove 11 and the oil grooves 13, 13 in the peripheral direction adjacent on both sides of the oil groove 11 function as two throttling units 2, 3 which change the areas in such a manner that one is increased when the other is decreased according to a relative angular displacement.

In the case where the hydraulic pressure control valve is applied to a power steering apparatus, an input shaft connected with a steering wheel and an output shaft connected with a steering mechanism are coupled coaxially through a tortion bar 4, the casing 10 being fixed coaxially on one joint end and the valve body 12 being integrally constructed on the other joint end. When steering torque is applied on the steering wheel, the relative angular displacement responsive to the tortion of the tortion bar 4 is generated between the casing 10 and the valve body 12. And as shown in the drawing, among the oil grooves 11, 11 . . . at the casing 10 side, half of them positioning every other groove are communicating with one oil chamber of a hydraulic cylinder S for assisting steering and the rest of them are communicating with other oil chamber respectively. Among the oil grooves 13, 13 . . . at the valve body 12 side, half of them positioning every other groove are communicating with a discharge side of a hydraulic pump P being a pressure oil supply source and the rest of them are communicating with an oil tank T being a discharge port respectively. Accordingly, both oil chambers of the hydraulic cylinder S being a destination of pressure oil are communicating with the discharge side of the hydraulic pump P or the oil tank T through one throttling unit consisting of the throttles 2, 2 . . . , and are communicating with the oil tank T or the discharge side of the oil pump P through other throttling unit consisting of the throttles 3, 3 . . . .

In the case where the relative angular displacement is generated between the casing 10 and the valve body 12 responsive to steering torque applied to the steering wheel for example, throttle areas of the throttles 2, 2 . . . are increased and throttle areas of the throttles 3, 3 . . . are decreased, when pressure oil introduced from the hydraulic pump P to each oil groove 13 passes through the throttles 2, 3 on both sides thereof to be flown into the adjacent oil grooves 11, 11, the conduction resistance at the throttle 2 becomes smaller than that at the throttle 3. Therefore, between the oil groove 11 communicating with the oil groove 13 through the throttle 2 and the oil groove 11 communicating with the same through the throttle 3, and between both oil chambers of the hydraulic cylinder S respectively communicating with the oil grooves 11, 11, such pressure difference that the former is higher than the latter is generated, the hydraulic cylinder S generating steering assisting force corresponding to the pressure difference.

In addition, in such a hydraulic pressure control valve, the numbers of the oil grooves 11, 11 . . . at the casing 10 side and the oil grooves 13, 13 . . . at the valve body 12 side are apt to be reduced in order to realize a small-sized valve, and as shown in FIG. 1, the one having six oil grooves 11, 11 . . . and six oil grooves 13, 13 . . . and six throttles 2, 2 . . . and six throttles 3, 3 . . . provided therebetween (hereinafter to be called a six-equally spaced valve) has been put into practical use.

By the way, the strength of the force required for steering a vehicle corresponds to the strength of road reaction force acting upon wheels. In the case where road reaction force is large such as low speed running, large force is required for steering operation. On the other hand, in the case where road reaction force is small such as high speed running, steering can be carried out by relatively small force. Accordingly, in a power steering apparatus, it is desired that such steering assisting force as follows is generated particularly in order to heighten the straight-drive stability. In the case where steering torque to be applied to the steering wheel is small, almost no steering assisting force is generated, and equal rigidity to that of hand steering is given to the steering wheel. When steering torque reaches a predetermined strength, it is required that a large steering assisting force is generated thereby force required for steering operation is to be as small as possible. In the middle state of the both, it is required that steering assisting force is gradually increased in proportion to increment of steering torque in order not to generate unnatural steering feeling by the sudden decrease of the force required for steering operation. Accordingly, desirable increment characteristic of steering assisting force in a power steering apparatus is, as shown in "SAE Technical Paper No. 880706, 1988", so called two-step characteristics as shown in FIG. 2, having a proportional gradual increase region between a constant region wherein steering torque is small and sudden increase region wherein steering torque is large. Further desirable characteristic is the one in which increasing rate (inclination of the gradual increase region in FIG. 2) more than a predetermined rate is obtained in the gradual increase region.

The hydraulic cylinder S generates steering assisting force corresponding to aforementioned operation of the hydraulic pressure control valve, and the strength thereof depends upon the reduction of throttle areas generated in the throttles 2, 2 . . . or the throttles 3, 3 . . . responsive to the relative angular displacement between the casing 10 and the valve body 12. In order to obtain aforesaid two-step characteristics, it is necessary to obtain the decreasing mode of throttle areas which gradually decreases until the relative angular displacement reaches a predetermined value and suddenly decreases when it reaches the predetermined value, in the throttles 2, 2 . . . and the throttles 3, 3 . . . . In order to realize aforesaid decreasing mode, such a hydraulic pressure control valve as represented by U.S. Pat. No. 3,591,136 is well known wherein a notch portion 20 is provided at the corner formed between the inner periphery of the casing 10 and the side wall of the oil groove 11 and having throttles 2 and 3, which consists of, as show in FIG. 3, a first portion 21 crossing the side wall of the oil groove 11 at substantially a right angle and almost in parallel with the inner peripheral surface of the casing 10, and of a second portion 22 crossing the projected end of the portion 21 and the inner peripheral surface of the casing 10 at substantially a right angle to connect them. In addition, FIG. 3 is a view where the peripheral surfaces of the casing 10 and the valve body 12 are unfolded on the straight line. That is to say, in the throttles 2 and 3 provided with the notch 20, until the corner of the valve body 12 side facing the notch portion 20 substantially agrees with the projected end of the first portion 21 according to the increase of the relative angular displacement, constant throttle areas depending only upon the depth d in the radial direction of the notch 20, can be obtained thereby, also by the proportional reduction of the throttle areas in the other throttles 2 and 3 in which the notch 20 is not provided, aforementioned decreasing mode can be obtained. In addition, the notch 20 can be provided at the corner of the valve body 12 side facing the corner of the casing 10 side, however, it is extremely difficult to form the notch 20 at the valve body 12 side. Generally, the notch 20 is formed by cutting the corresponding corner of the casing 10 by polishing after broaching the inner peripheral surface of the casing 10.

Now, as aforementioned equally-spaced six valves to obtain two-step characteristic, there is the one disclosed in Japanese Patent Application Laid-Open No. 61-94870, 1986. The notches are provided at three throttles 2, 2, 2 and the throttles 3, 3, 3 respectively positioning at both sides of either three oil grooves 13, 13, 13 communicating with the discharge side of the hydraulic pump P or those communicating with the oil tank T among six oil grooves 13, 13 . . . at the valve body 12 side in FIG. 1.

In the two-step characteristic obtained, as shown in FIG. 2, by the formation of the notch 20, it is desired as aforementioned that an inclination more than the predetermined one is obtained at the gradual increase region. As the inclination depends upon the sum of the depths d in the radial direction of the notch 20 as shown in FIG. 3 and is apt to increase as the sum decreases, it is necessary to make each depth d of each notch 20 as small as possible in order to obtain the desired two-step characteristic. On the other hand, in forming the notch 20 carried out by aforementioned procedure, a processing error of about 0.02 mm in broaching and that of about 0.005 mm in polishing the inner peripheral surface of the casing 10 are generated respectively. In addition, generation of a core displacement error of about 0.01 mm cannot be prevented during broaching and polishing. The lower limit value of the depth d should be 0.04 mm to secure some degree of oil passage even when these deviations are piled up in the same direction.

However, as disclosed in aforementioned Japanese Patent Application Laid-Open No. 61-94870, 1986, in the case where notches 20 are provided at three throttles 2, 2 . . . and three throttles 3, 3 . . . , even when the respective depths d of the notches are set to the lower limit value 0.04 mm, there has been a problem that the inclination in the gradual increase region of steering assisting force is too small in a power steering apparatus in which the hydraulic pressure control valve is used, thereby steering feeling is worsened by sudden decrease of the operation force for steering wheel in a transit region from gradual increase region to sudden increase region.

The applicants of the present invention has proposed in U.S. Pat. No. 4,924,910 a hydraulic pressure control valve in which communication of the oil tank T with the two oil grooves 13, 13 facing to each other among the four oil grooves 13, 13 . . . to be communicated originally with the oil tank T at the valve body 12 side, is shut off and at the same time such notches 20 as mentioned above are formed at the throttles 2 and 3 on both sides of the shut-off portion, as the one to reduce flowing noises generated during the operation of an eight-equally spaced valve provided with two throttling units having eight throttles. In this hydraulic pressure control valve, as the notches 20 are provided only on two throttles 2, 2 and the throttles 3, 3, a sufficient inclination in gradual increase region can be obtained to satisfy steering feeling in the case where the depths d of the notches are set to the lower limit value 0.04 mm. On the contrary, in the case where this construction is adopted in the manner that six valves are equally spaced, communication of one or two of three oil grooves 13, 13, 13 communicating with the oil tank T should be shut off therewith, thereby pressure imbalance is brought about in the radial direction of the valve body 12. In the case where the imbalance is larger due to a large steering wheel operation, the relative rotation between the casing 10 and the valve body 12 is obstructed and the hydraulic pressure control valve can't operate normally.

SUMMARY OF THE INVENTION

The present invention has been devised in consideration of these circumstances, and the primary object of the invention is to provide a hydraulic pressure control valve capable of obtaining a desired inclination (an increasing rate) at gradual increase region of steering assisting force in the case where the valve is applied to a power steering apparatus.

Another object of the present invention is to provide a hydraulic pressure control valve in which the relative rotation between a casing and a valve is not obstructed in the case where the valve is applied in a power steering apparatus.

Further object of the invention is to provide a hydraulic pressure control valve capable of realizing a satisfying steering feeling in the case where the valve is applied to a power steering apparatus.

The hydraulic pressure control valve related to the invention is so constructed that a valve body of circular section having six oil grooves on its outer periphery at specified intervals is disposed in a cylindrical casing having six oil grooves on its inner periphery at specified intervals, and two throttling units consisting of respective six throttles is provided by constructing throttles on both side of each oil groove, and among six throttles constructing one throttling unit, two throttles facing to each other in the radial direction have regions in which the throttle areas do not substantially change until the relative angular displacement between the valve body and the casing reaches a predetermined magnitude. Particularly in the hydraulic pressure control valve of the present invention, two throttling units are disposed between respective two different destinations and the supply source of pressure oil and discharge port, thereby pressure oil to the destination is controlled by the variation of the throttle areas created in both throttling units responsive to the relative angular displacement.

The above and further objects and features of the invention will more fully be apparent from the following detailed description with accompanying drawings.

DESCRIPTION OF THE PREFERRED EMBODIMENTS

In the following, explanation will be give on the present invention referring to drawings showing the embodiments thereof.

Figure 4:
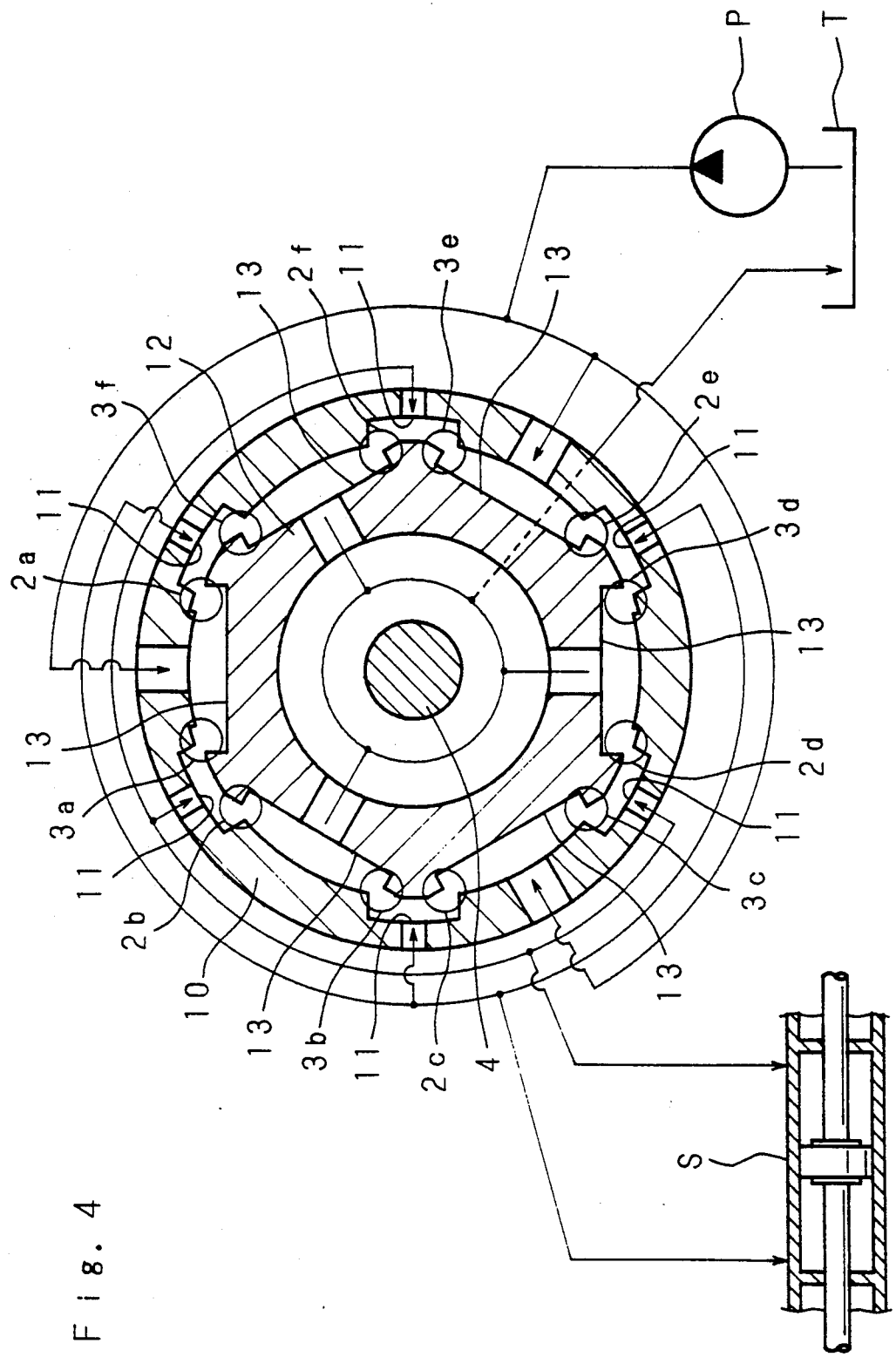
FIG. 4 is a schematic cross sectional view of a hydraulic pressure control valve related to the invention.

FIG. 4 is a schematic cross sectional view of a hydraulic pressure control valve related to the invention applied to a power steering apparatus.

The hydraulic pressure control valve related to the invention is a six-equally spaced valve comprising the cylindrical casing 10 having six oil grooves 11, 11 . . . extending in the axial direction on its inner peripheral surface at specified intervals, and the cylindrical valve body 12 disposed in the casing 10 axially and rotatably and having six oil grooves 13, 13 . . . extending in the axial direction on its outer peripheral surface at specified intervals. As shown in the figure, the casing 10 and the valve body 12 are so positioned that the oil grooves 11, 11 . . . at the casing 10 side and the oil grooves 13, 13 . . . at the valve body 12 side are to be stagger-arranged in the peripheral direction. Between the oil grooves 11, 11 . . . and the oil grooves 13, 13 . . . adjacent on both sides thereof in the peripheral direction, two throttling units comprising respective six throttles $2a$ through $2f$ and $3a$ through $3f$ are formed. The opening of one unit increases as that of the other decreases responsive to the relative angular displacement between the casing 10 and the valve body 12.

The hydraulic pressure control valve is so applied to a power steering apparatus that relative angular displacement responsive to the tortion of the tortion bar 4 is to be generated between the casing 10 and the valve body 12 when steering torque is applied to the steering wheel, like the conventional one, by connecting an input shaft (not shown) which connects with the steering wheel to an output shaft (not shown) which connects with the steering mechanism coaxially through the tortion bar 4, and fixing the casing 10 coaxially on the joint ends of one side of these shafts, and constructing the valve body 12 integrally on the other joint ends. And as shown in the figure, among six oil grooves 11, 11 . . . at the casing 10 side, three oil grooves 11, 11, 11 positioning every other one are respectively communicated with the oil chambers on both sides of the hydraulic cylinder S for assisting steering disposed in the steering mechanism. Among six oil grooves 13, 13 . . . at the valve body 12 side, three oil grooves 13, 13, 13 positioning every other one are communicated with the discharge side of the hydraulic pump P being pressure oil supply source, and the rest three oil grooves 13, 13 13 are respectively communicated with the oil tank T maintained at a low pressure state. In addition, the tortion bar 4 is positioned coaxially with the valve body 12 in the hollow part therein, the annular chamber formed between the outer periphery of the tortion bar 4 and the inner periphery of the valve body 12 being used as a reflux oil passage to the tank T as shown in the figure.

Both chambers of the hydraulic cylinder S being the destination of pressure oil are respectively communicated with the hydraulic pump P or the hydraulic tank T through one throttling unit consisting of six throttles $2a$ through $2f$, and are respectively communicate with the hydraulic tank T or the hydraulic tank P through the other throttling unit consisting of six throttles $3a$ through $3f$. The pressure oil introduced into the three oil grooves 13, 13, 13 from the hydraulic pump P flows into the respectively adjacent oil grooves 11, 11 . . . through the throttles $2a$, $2c$, $2e$ or the throttles $2a$, $3c$, $3e$ on both sides of the grooves 13, and flows into the rest three oil grooves 13, 13, 13 through the throttles $3f$, $3b$, $3d$ or the throttles $2b$, $2d$, $2f$ on the other side of these oil grooves 11, 11 . . . , and flows back to the oil tank T through a reflux hole opening therein and the annular chamber at the inner side of the valve body 12.

Figure 5:
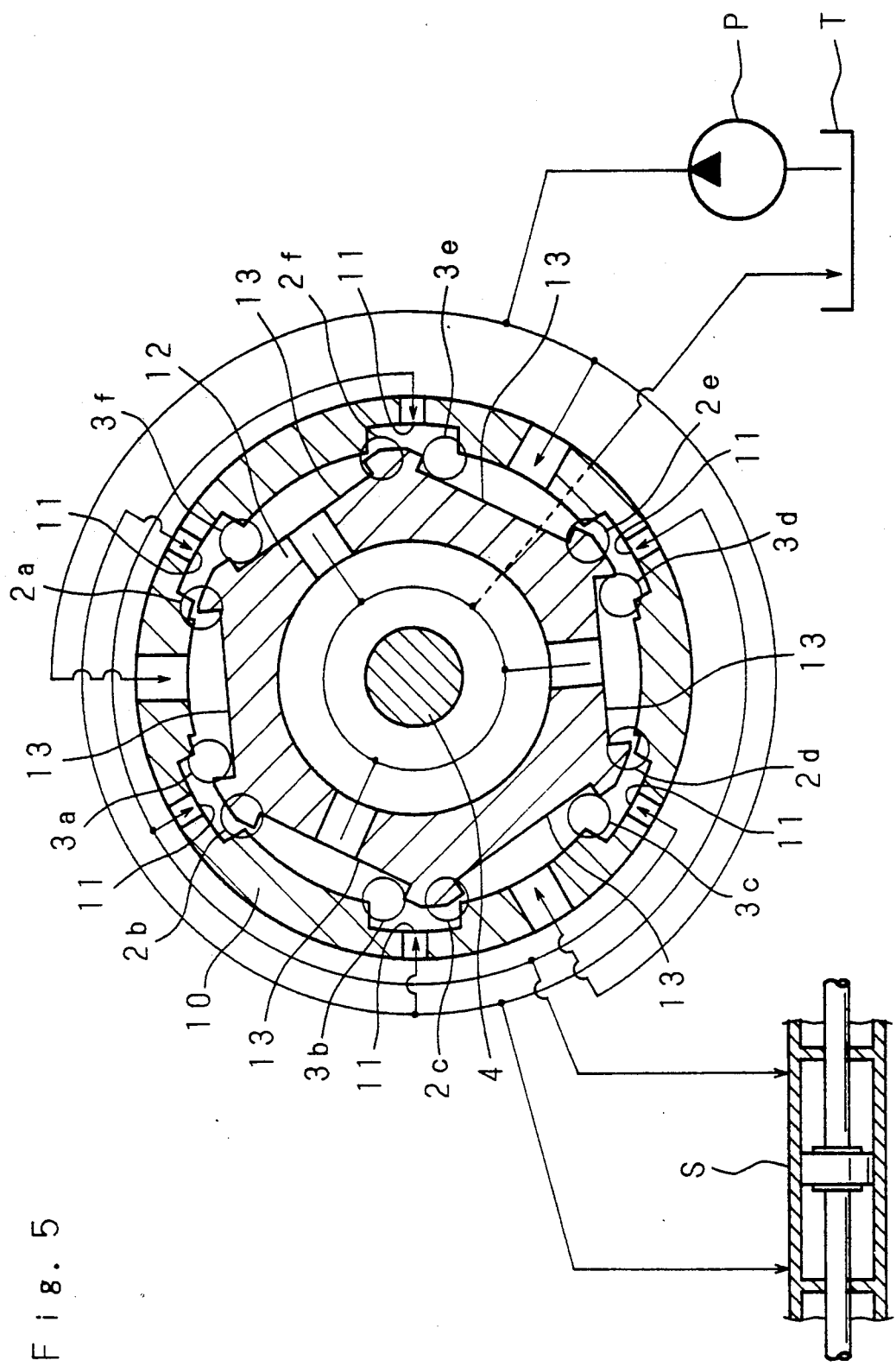
FIG. 5 is a view showing an operation state of a hydraulic pressure control valve related to the invention.

FIG. 5 shows a state in which steering torque is applied to the steering wheel and the relative angular displacement is generated between the casing 10 and the valve body 12, that is, the operating state. In the case, as shown in the figure, where the throttle areas of the throttles $2a$ through $2f$ are decreased and those of the throttles $3a$ through $3f$ are increased, when the pressure oil introduced into the oil grooves 13, 13, 13 from the hydraulic pump P flows as aforementioned, the conduction resistance at the throttles $2a$, $2c$, $2e$ on one sides of the oil grooves 13, 13, 13 is larger than that at the throttles on the other sides. In this case, between the oil grooves 11, 11, 11 communicating with the oil grooves 13, 13, 13 through the throttles 2a, 2c, 2e and the oil grooves 11, 11, 11 communicating with the oil grooves 13, 13, 13 through the throttles 3a, 3c, 3e, there is generated a pressure difference, the pressure of the latter being higher than that of the former, thereby the hydraulic cylinder S is to generate steering assisting force corresponding to this pressure difference.

On the other hand, in the case where the relative angular displacement between the casing 10 and the valve body 12 is opposite to the direction shown in FIG. 5, as the throttle areas of the throttles 2a through 2f are increased and those of the throttles 3a through 3f are decreased, a pressure difference whose direction is opposite to the previous case is generated between both oil chambers of the hydraulic cylinder S, and the hydraulic cylinder S generates steering assisting force responsive to this pressure difference.

Figure 1:
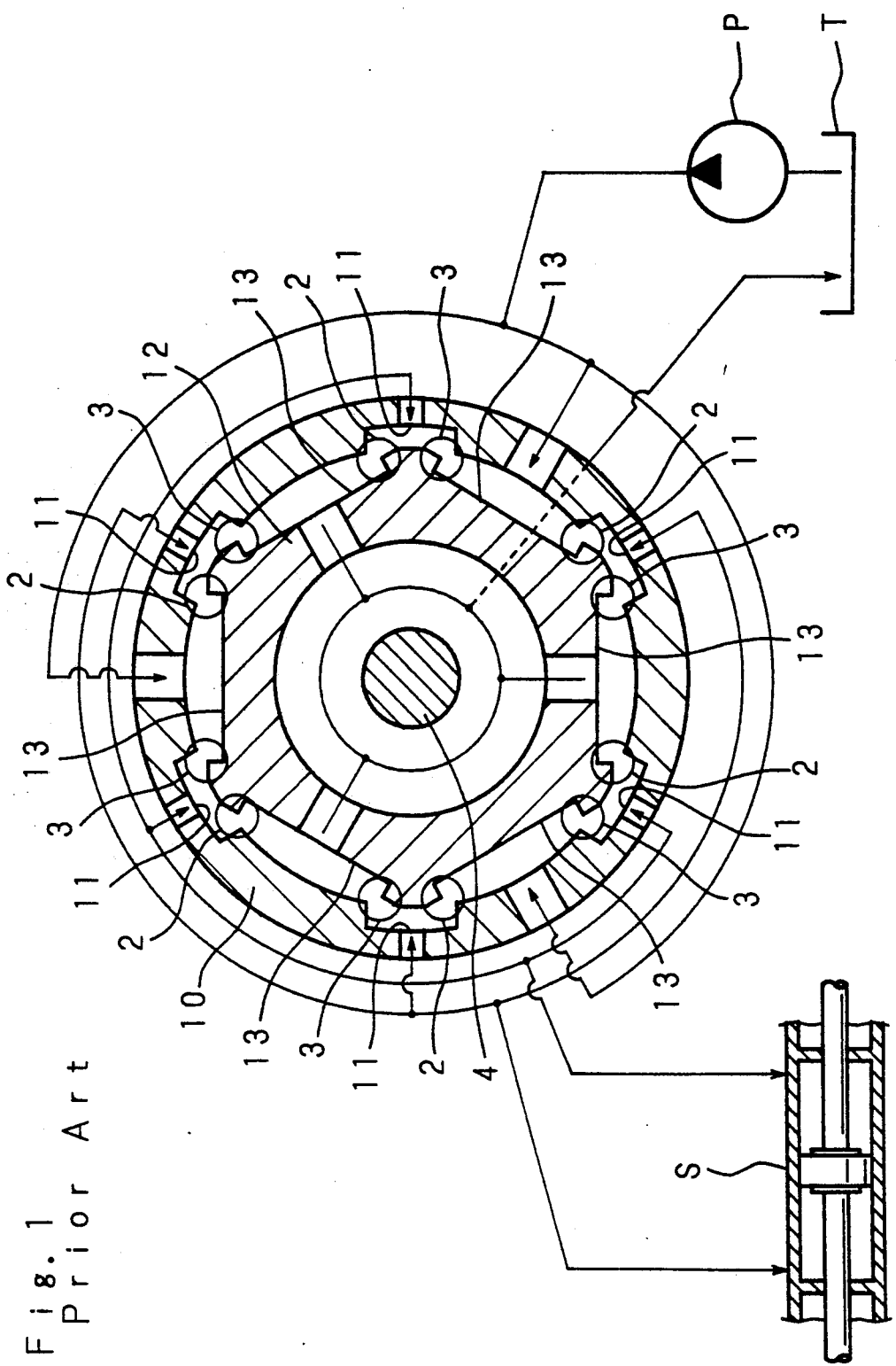
FIG. 1 is a schematic cross sectional view of a conventional hydraulic pressure control valve.
Figure 2:
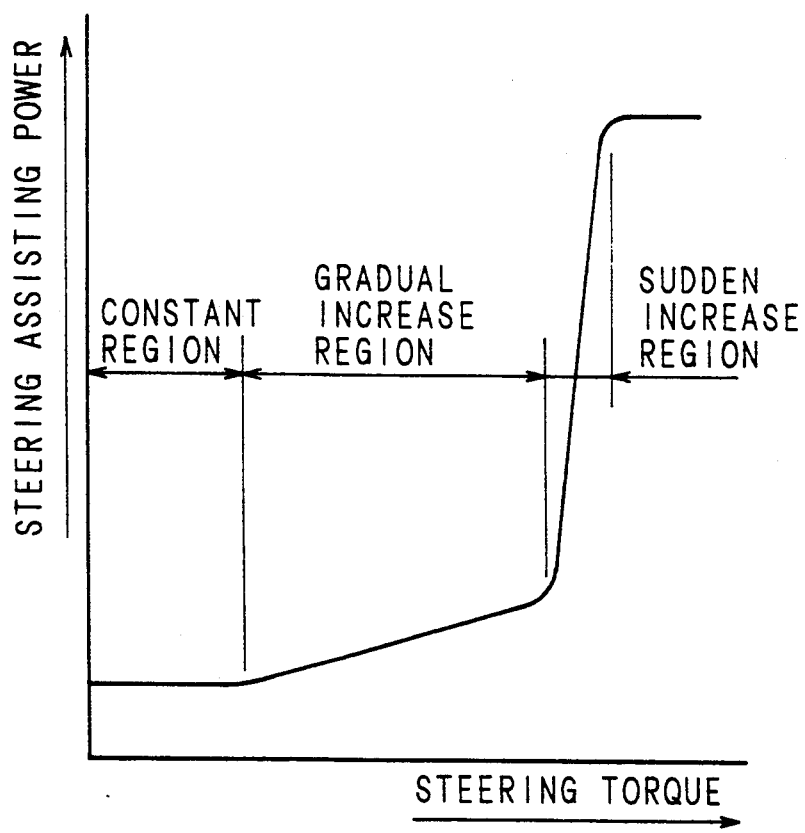
FIG. 2 is a view showing a desired inclement characteristic of steering assisting force in a power steering apparatus.

In this way, the hydraulic pressure control valve related to the invention changes the throttle areas of the throttles 2a through 2f and the throttles 3a through 3f responsive to the relative angular displacement generated between the casing 10 and the valve body 12 in substantially proportion to steering torque applied to the steering wheel, and controls pressure oil to both oil chambers of the hydraulic cylinder S, thereby the hydraulic cylinder S is to generate steering assisting force. Accordingly, the increment characteristic of steering assisting force obtained at this time depends upon decreasing mode of the throttle areas generated by the throttles 2a through 2f or the throttles 3a through 3f according to the relative angular displacement. In order to obtain the increment characteristic of steering assisting force as shown in FIG. 2, that is, two-step characteristic, the decreasing mode of throttle areas which gradually decreases until the relative angular displacement reaches to a predetermined value and suddenly decreases after that should be realized, in the throttles 2a through 2f and the throttles 3a through 3f as aforementioned. And the hydraulic pressure control valve related to the invention is characterized by obtaining variation mode of throttle areas as aforementioned in the whole throttling units by making respective two throttles facing to each other in the radial direction among six throttles 2a through 2f or among six throttles 3a through 3f constructing throttling units be throttles (hereinafter to be called U-throttles) which have region in which throttle areas do not change substantially until aforementioned relative angular displacement reaches a predetermined magnitude and by making the rest four throttles be ones (hereinafter to be called T-throttles) by which throttle areas decrease substantially in proportion to the increase of relative angular displacement. In FIG. 4 and FIG. 5, the throttles 2a, 3a and the throttles 2d, 3d respectively facing to each other in the radial direction are to be U-throttles. The combination of two throttles to be U-throttles may be chosen among any throttles 2a through 2f if only they face to each other in the radial direction, and it is the same with the combination among the throttles 3a through 3f. In addition, Combinations in both throttling units can be different from each other. For example, when the throttles 2a and 2d are to be U-throttles in one throttling unit, the throttles 3b and 3e are to be U-throttles in the other throttling unit, or the throttles 3c and 3f are to be U-throttles.

Figure 6:
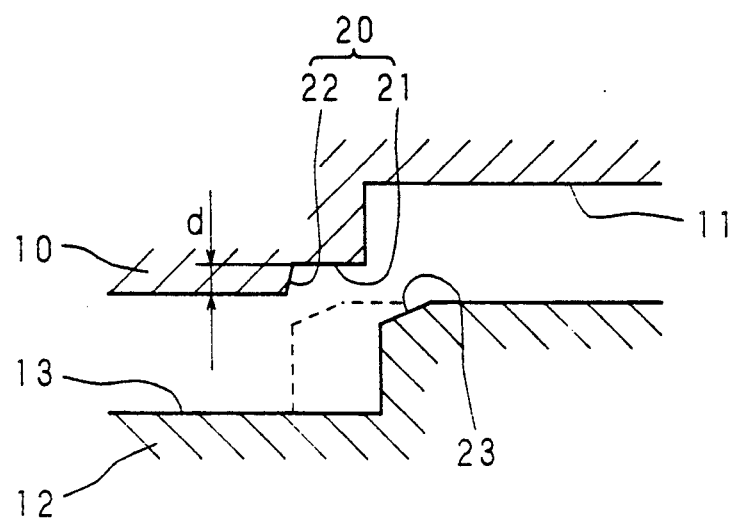
FIG. 6 is an enlarged sectional view showing a construction mode of two throttles among six throttles.
Figure 7:
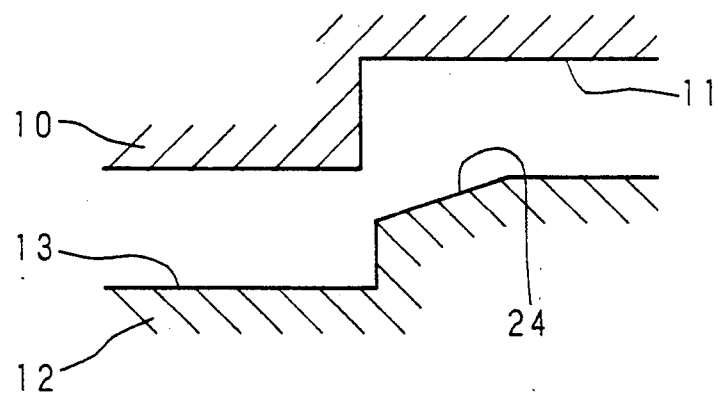
FIG. 7 is an enlarged sectional view showing a construction mode of the rest of four throttles.

FIG. 6 and FIG. 7 are enlarged sectional views respectively showing concrete constructions of a U-throttle and a T-throttle. In addition, each of them is a view in which the peripheral surfaces of the casing 10 and the valve body 12 are unfolded on a straight line.

Figure 3:
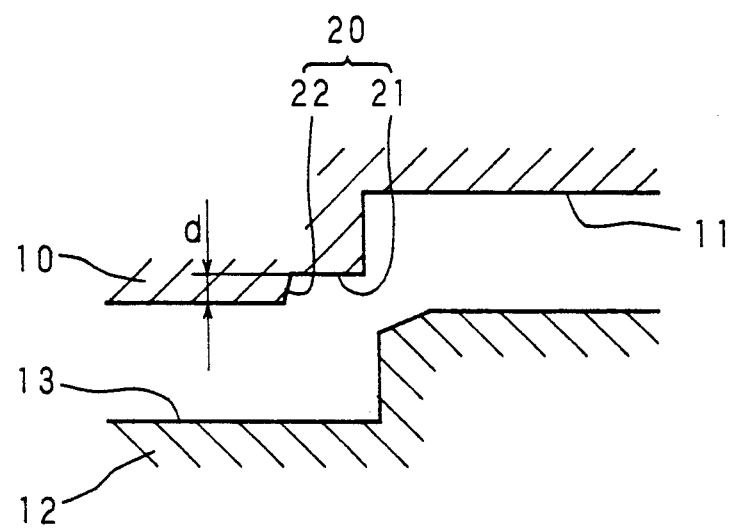
FIG. 3 is a view showing a construction mode of a throttle having a region whose area does not vary.

As shown in FIG. 6 at the corner between the inner peripheral surface of the casing 10 and the side wall of the oil groove 11, the U-throttle has the notch 20 consisting of a first portion 21 crossing the side wall at nearly a right angle and being in parallel with the inner peripheral surface of the casing 10 and a second portion 22 crossing the portion 21 and the inner peripheral surface of the casing 10 respectively at substantially a right angle and connecting the both, and at the corner facing aforementioned corner and formed between the outer peripheral surface of the valve body 12 and the side wall of the oil groove 13, the U-throttle has a linear or circular-like notch 23 which chamfers the corner at a predetermined angle. In addition, the notch 20 is substantially the same one as shown in FIG. 3. The throttle areas of the U-throttles as maintained substantially constant regardless of the increment of the relative angular displacement as they are controlled by the depth d in the radial direction of the first portion 21 at the notch 20 until the relative angular displacement is generated between the casing 10 and the valve body 12 and the valve body 12 reaches the position at which the side wall of the oil groove 13 agree with the end portion of the notch 20 in the peripheral direction, that is, the valve body 12 reaches the position shown with a broken line in the figure. After that, until the valve body 12 reaches the position (closure position) at which the end portion of the notch 20 and the end portion of the notch 23 at the valve body 12 side agrees with each other, as they are controlled by the depth of the notch 23 successively decreasing in the peripheral direction, they gradually decrease until reaching nearly zero as the relative angular displacement increases.

The T-throttle, as shown in FIG. 7, has a notch 24 only at the corner of the valve body 12 side, which chamfers the corner at a predetermined angle. Thereby, in the T-throttle, immediately after the relative angular displacement between the casing 10 and the valve body 12 is generated, a big variation in the throttle areas is shown, and then, until the end portion at the outer periphery side of the valve body 12 of the notch 24 reaches the closure position at which it agrees with the facing corner of the casing 10, such variation mode of the throttle areas is obtained as gradually decreases at substantially constant changing rate regardless of the increase of the relative angular displacement. In addition, the length in the peripheral direction of the notch 24 in the T-throttle is made to be nearly same as summation of that of the notch 20 and that of the notch 23 in the U-throttle, thereby the U-throttle and the T-throttle can be closed at the same time.

Figure 8:
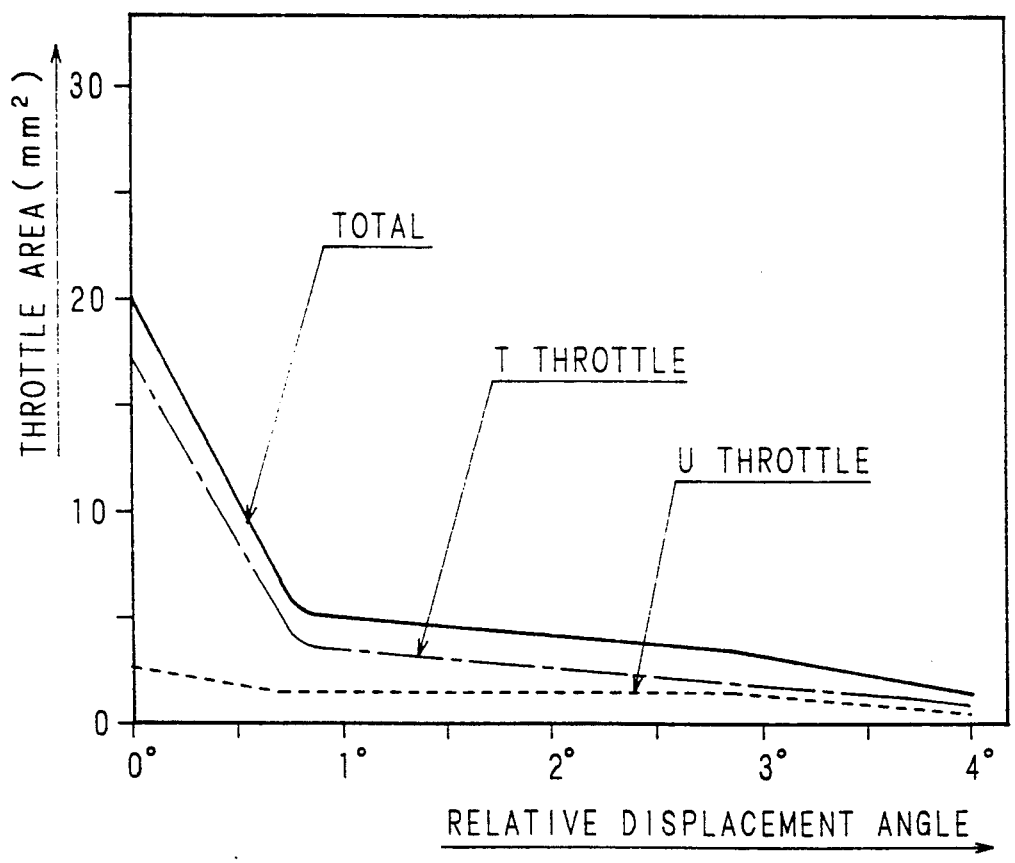
FIG. 8 is a view showing variation mode of throttle area of a hydraulic pressure control valve related to the invention.

FIG. 8 is a view showing a variation mode of the throttle areas of the whole throttling units provided with the U-throttles and the T-throttles. As shown with a broken line, in the figure, in the U-throttle, a region where throttle area is constant is obtained in the sphere where relative displacement angle is smaller than 3°. In addition, as shown with a dashed line in the figure, in the T-throttle, a variation mode of the throttle areas gradually and proportionally decreasing in substantially the whole range of relative displacement angles. Here, as aforementioned, there are provided two U-throttles and four T-throttles and the throttle areas shown with the broken line and the dashed line show the respective total areas. Accordingly, in the throttling units consisting of the throttles 2a through 2f or the throttles 3a through 3f of the hydraulic pressure control valve related to the invention, as shown with the solid line in the figure, a gradual decrease portion is obtained whose throttle area gradually decreases proportionally to the increase of the relative angular displacement at a corresponding portion to the region where the throttle area is constant in the U-throttle, after the sudden decrease portion of the throttle area in a region where relative displacement angle is small, the gradual increase region of steering assisting force as shown in FIG. 2 being obtained corresponding to the period abovementioned.

The increasing rate of steering assisting force at the gradual increase region corresponds to the decreasing rate of the throttle areas at the gradual decrease portion, and the gradual decrease portion of the throttle areas appears in a region where areas of the U-throttle is constant. Therefore in order to secure the more increasing rate than a predetermined one of steering assisting force at the gradual increase region so as to obtain satisfying steering feeling, it is efficient to make the depth d small in the radial direction of the notch 20 which determines the throttle area of the U-throttle at the region where the area is constant. The depth d, however, has a lower limit value due to restriction in processing as aforementioned.

In the hydraulic pressure control valve related to the invention, only two throttles among six throttles 2a through 2f and two throttles among six throttles 3a through 3f are the U-throttles, and in the case where these throttles are both to have aforesaid lower limit value, they can give a predetermined inclination to the gradual increase region of steering assisting force. In addition, as the U-throttles are constructed at positions facing to each other in the radial direction, there is no fear that there is generated pressure imbalance in the radial direction. That is, the reason why the number of the U-throttles are to be two in each throttling unit in the present invention is to secure the satisfying inclination of steering assisting force in the gradual increase region by making the least number of throttles to be U-throttles under the condition that pressure imbalance is not generated in the radial direction, and my making the aforementioned constant area as small as possible according to the depth d of the notch 20 within the allowance in processing. In the hydraulic pressure control valve related to the invention, the two step characteristic is realized so that satisfying steering feeling can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A hydraulic pressure control valve, comprising:
   a casing having six first oil grooves on its inner peripheral surface at specified intervals;
   a valve body rotably disposed in said casing and having six second oil grooves on its outer peripheral surface at specified intervals; and
   two throttling units each of which consists of six throttles formed between said first oil groove and second oil grooves and facing to each other in the radial direction;
   wherein respective said two throttling units are disposed between two different destinations, and a supply source of pressure oil and discharge port of pressure oil; and
   respective two throttles facing to each other in the radial direction in each of said two throttling units, one of which communicates with a discharge port of pressure oil and the other of which communicates with a supply source of pressure oil, are ones whose throttle areas do not substantially change until the relative angular displacement between said casing and said valve body reaches a predetermined magnitude.

2. A hydraulic pressure control valve as set forth in claim 1, wherein
   respective said two throttling units are disposed between two different destinations, and a supply source of pressure oil and discharge port of pressure oil.

3. A hydraulic pressure control valve as set forth in claim 2,
   wherein said two destinations are two oil chambers of a hydraulic cylinder for assisting steering of a hydraulic power steering mechanism.

4. A hydraulic pressure control valve as set forth in claim 1, wherein
   said respective two throttles have respectively a first notch on a first corner formed between the inner peripheral surface of said casing and the side wall of said first oil groove, said first notch being provided with a first portion which crosses said side wall at substantially right angle and is substantially parallel to said inner peripheral surface and with a second portion which crosses said first portion and the inner peripheral surface of said casing at substantially right angle thereby to connect the both, and have respectively a second linear or a circular-like notch on a second corner formed between the outer peripheral surface of said valve body and the side wall of said second oil groove, said second notch being formed by chamfering said second corner at a predetermined angle.

5. A hydraulic pressure control valve, comprising:
   a casing having six first oil grooves on its inner peripheral surface at specified intervals;
   a valve body rotatably disposed in said casing and having six second oil grooves on its outer peripheral surface at specified intervals; and
   two throttling units each of which consists of six throttles formed between said first oil groove and second oil groove and facing to each other in the radial direction;
   wherein respective said two throttling units are disposed between two different destinations, and a supply source of pressure oil and discharge port of pressure oil;
   respective two throttles facing to each other, in the radial direction in each of said two throttling units, one of which communicates with a discharge port of pressure oil and the other of which communicates with a supply source of pressure oil, are ones whose throttle areas do not substantially change until the relative angular displacement between said casing and said valve body reaches a predetermined magnitude; and the respective rest four throttles facing to each other in the radial direction among respective six throttles constructing said two throttling units are ones whose throttle areas decrease gradually in relation to the increase of the relative angular displacement.

6. A hydraulic pressure control valve as set forth in claim 5, wherein said respective two throttles have a first notch on the corner formed between the inner peripheral surface of said casing and the side wall of said first oil groove, said first notch being provided with a first portion which crosses said side wall at substantially right angle and is substantially parallel to said inner peripheral surface and with a second portion which crosses said first portion and the inner peripheral surface at substantially right angle thereby to connect the both, and has a second linear or circular-like notch on a corner formed between the outer peripheral surface of said valve body and the side wall of said second oil groove, said second notch being formed by chamfering said corner at a predetermined angle, and said respective rest four throttles have respectively a third linear or circular-like notch on a third corner formed between the outer peripheral surface of said valve body and the side wall of said second oil groove, said third notch being formed by chamfering said third corner at a predetermined angle.

7. A hydraulic pressure control valve as set forth in claim 6, wherein the length in the peripheral direction of said third notch is substantially same as summation of that of said first notch and that of said second notch.

8. A hydraulic pressure control valve comprising:

a casing having six first oil grooves disposed on its inner peripheral surface;

a valve body rotatably disposed in said casing and having six second oil grooves disposed on its outer peripheral surface;

a first throttling unit having three radially facing pairs of throttles formed between said first and second oil grooves;

a second throttling unit having three radially facing pairs of throttles formed between said first and second oil grooves;

wherein, upon rotation of said casing relative to said valve body in a first direction, said radially facing pairs of throttles in said first throttle unit increase in throttle area and said radially facing pairs of throttles in said second throttle unit decrease in throttle area;

wherein, upon rotation of said casing relative to said valve body in a second direction, said radially facing pairs of throttles in said first throttle unit decrease in throttle area and said radially facing pairs of throttles in said second throttle unit increase in throttle area;

wherein said first and second throttle units are disposed between and in fluid communication with a source of pressure oil and a discharge port;

wherein said first and second throttle units are in fluid communication with first and second chambers of a hydraulic cylinder so that:

when said casing rotates relative to said valve body in said first direction, said first chamber is in fluid communication with said source of pressure oil and said second chamber is in fluid communication with said discharge port; and when said casing rotates relative to said valve body in said second direction, said first chamber is in fluid communication with said discharge port and said second chamber is in fluid communication with said source of pressure oil;

wherein a selected radially facing pair of throttles in said first throttle unit have throttle areas which do not substantially change until said casing rotates relative to said valve body in said second direction by a predetermined amount;

wherein one of said throttles in said selected radially facing pair in said first throttle unit fluidly communicates with said source of pressure oil and the other of said throttles in said selected radially facing pair in said first throttle unit fluidly communicates with said discharge port;

wherein a selected radially facing pair of throttles in said second throttle unit have throttle areas which do not substantially change until said casing rotates relative to said valve body in said first direction by a predetermined amount; and wherein one of said throttles in said selected radially facing pair in said second throttle unit fluidly communicates with said source of pressure oil and the other of said throttles in said selected radially facing pair in said second throttles unit fluidly communicates with said discharge port.

9. The hydraulic pressure control valve according to claim 8 wherein alternating ones of said second oil grooves each include a first opening in fluid communication with one of said oil pressure source or discharge port, and wherein said casing includes a second opening facing each second oil groove not having a first opening located therein, each second opening being in fluid communication with the other oil pressure source or discharge port.

* * * * *